United States Patent [19]
Breed

[11] Patent Number: 6,009,970
[45] Date of Patent: *Jan. 4, 2000

[54] TAPE SWITCH CRUSH SENSOR

[75] Inventor: David S. Breed, Boonton, N.J.

[73] Assignee: Automotive Technologies Int'l., Inc., Boonton Township, N.J.

[ * ] Notice: This patent is subject to a terminal disclaimer.

[21] Appl. No.: 08/358,976

[22] Filed: Dec. 19, 1994

Related U.S. Application Data

[63] Continuation of application No. 08/104,246, Aug. 9, 1993, abandoned, which is a continuation of application No. 07/727,756, Jul. 9, 1991, abandoned.

[51] Int. Cl.$^7$ .................................................. B60K 28/14
[52] U.S. Cl. ............................................ 180/274; 280/735
[58] Field of Search ..................... 280/735, 806; 180/271, 274; 296/35.2, 189; 200/61.43, 61.44, 61.45 R, 61.53, 86 R; 293/4

[56] References Cited

U.S. PATENT DOCUMENTS

| | | | |
|---|---|---|---|
| 3,495,675 | 2/1970 | Hass et al. | 180/274 |
| 3,694,600 | 9/1972 | Koenig | 200/86 R |
| 3,710,054 | 1/1973 | Koenig | 200/89 R |
| 3,715,541 | 2/1973 | Koenig | 200/86 R |
| 3,720,915 | 3/1973 | Hass | 180/274 |
| 3,853,199 | 12/1974 | Hirashima et al. | 200/61.44 X |
| 3,859,482 | 1/1975 | Matsui et al. | 340/436 |
| 4,346,913 | 8/1982 | Schrauf et al. | 280/735 |

FOREIGN PATENT DOCUMENTS

| | | | |
|---|---|---|---|
| 1145696 | 3/1963 | Germany | 200/86 R |
| 2348151 | 4/1974 | Germany | 280/735 |
| 2808872 | 9/1979 | Germany | 280/735 |
| 2225660 | 6/1990 | United Kingdom | 280/735 |

*Primary Examiner*—Paul N. Dickson
*Attorney, Agent, or Firm*—Samuel Shipkovitz; Brian Roffe

[57] ABSTRACT

A crash sensor designed for arrangement in the crush zone of a motor vehicle, is operative to determine when and if a crash is severe enough to deploy a passive restraint system (i.e., air bag or seat belt tensioner) of the vehicle. The sensor is of the crush switch type and incorporates a flex action tape switch and is responsive to trigger the passive restraint system when the vehicle impact causes vehicle elements in the crush zone to deform as far back as the sensor position. The sensor operates on bending as well as compression and is designed to trigger on the relative motion of two adjacent parts of the vehicle in the crush zone. The sensor latches closed during the crash additionally permitting it to be used in series with a non-crush zone mounted discriminating sensor.

10 Claims, 10 Drawing Sheets

TAPE SWITCH CRUSH SENSOR

This application is a continuation, of application Ser. No. 08/104,246, filed Aug. 9, 1993, now abandoned, which is a continuation of Ser. No. 07/727,756, filed Jul. 9, 1991, now abandoned.

CROSS REFERENCE

This invention is an improvement on the invention disclosed in U.S. Pat. No. 4,995,639 and a full discussion of the background of this general type of sensor is disclosed in that patent and included herein by reference.

BACKGROUND OF THE INVENTION

Many types of crash sensors have been proposed and used for determining if a crash is severe enough to require the deployment of a passive restraint system such as an air bag or seat belt tensioner.

Three types of sensors have been widely used to sense and initiate deployment of an air bag passive restraint system. These sensors include an air damped ball-in-tube sensor such as disclosed in Breed U.S. Pat. Nos. 3,974,350, 4,198,864, 4,284,863, 4,329,549 and 4,573,706, a spring mass sensor such as disclosed in Bell U.S. Pat. Nos. 4,116,132, 4,167,276 and an electronic sensor such as is part of the Mercedes air bag system. Each of these sensors has particular advantages and shortcomings which were discussed in detail in the patent cross referenced above.

The Use of tape or ribbon switch technology as a crush switch was also disclosed in the above cross-referenced patent. Further research has shown that an improvement of this particular implementation of the invention has significant advantages over some of the other implementations since the switch can be easily made long and narrow and it can be made to respond to bending. In the first case it can be designed to cover a significant distance across the vehicle which increases the probability that it will be struck by crushed material or bent as the crush zone propagates rearward in the vehicle during a crash. In the second case it can be made small and located to sense the fact that one part of the vehicle has moved relative to some other part or that the structure on which the sensor is mounted has deformed. The term "given position" of where the sensor should be located (rear boundary of the c"crush zone") is described in the '639 patent of Breed cited above at col. 6 line 57 et seq. and is also as to FIGS. 8–11 therein.

Other crush zone mounted crash sensors including crush switch designs where the width and height dimensions are comparable, must either be large and thus heavy, expensive and difficult to mount, or there is a possibility that the randomly shaped crushed material which forms the boundary of the crush zone will bridge the sensor resulting in late triggering. This crushed material frequently contains holes, wrinkles or folds or portions that may even be displaced or torn out during the crash with the result that it is difficult to guarantee that a particular small area where the sensor is mounted will be struck early in the crash.

A significant improvement results, therefore, if the sensor can stretch across more of the vehicle or if it can determine that there has been relative motion or deformation of a portion of the vehicle on which the sensor is mounted. The improved sensors described herein that are an object of this invention are small in height and thickness but can extend to whatever length is necessary to achieve a high probability of a sensor triggering on time in a crash. A short sensor can be used if it is carefully mounted onto portions of the vehicle which will cause the sensor to bend during a crash.

It has been found that conventional designs of tape or ribbon switches have the drawback that the force required to close the switch is very small compared with the forces which are normally present in automobile crashes. During routine maintenance of the vehicle, the normal tape switch may be damaged or otherwise made to close and remain closed, with the result that later, when the vehicle encounters a pot hole or other shock sufficient to cause the arming sensor to close, an inadvertent air bag deployment can result. Similarly, if the tape switch is mounted on the front of the radiator support, which is a preferred mounting locating for crush zone sensors, hail, heavy rain, stones or other debris from the road might impact the tape switch and cause a momentary closure or damage it. If this happens when the vehicle experiences a shock sufficient to cause the arming sensor to close, an inadvertent air bag deployment might also occur. The force typically required to close a tape switch is less than one pound whereas tens of thousands of pounds are required to stop a vehicle in a crash and local forces greatly in excess of 20 pounds are available to actuate a sensor during a crash.

The present invention seeks to eliminate these drawbacks through the use of a tape switch design which requires either a large force to actuate or a bending of the switch due to structural deformation as explained below.

SUMMARY OF THE INVENTION

The sensor of this invention uses the crushing of the vehicle itself as a measure of the severity or velocity change of the crash as is the case with the other designs in the patent cross referenced above. The particular improvements over the earlier tape switch versions of the crush sensing switch, are the requirement that a substantial force be applied to the sensor or that the structure upon which the sensor is mounted deforms resulting in the switch being bent (See description of FIG. 6 below.). Since large forces or structural deformations are unlikely to occur except when the vehicle is in an accident, these requirements serve to further distinguish a crash from a non-crash event. Other advantages also easily result from the sensor of this design which could be achieved with sensors of different designs as explained below.

A principal object of this invention is to provide a tape switch type crush switch crash sensor which requires a substantial force to function.

Another object of this invention is to provide a crush switch crash sensor which functions when a portion of the vehicle where the sensor is mounted is displaced, deformed or otherwise bends or buckles.

A further object of this invention is to provide a crash sensor which latches closed in an accident where an air bag is required.

Yet another object of this invention is to provide a crush switch type crash sensor which does not require a strong mounting structure.

An additional object of this invention is to provide a small inexpensive yet highly reliable crash sensor.

Still another object of this invention is the use of a crush zone mounted sensor in series with a passenger compartment mounted discriminating sensor to permit a better discrimination between air bag desired and not desired crashes such as animal impacts.

A further object of this invention is to use a crush zone mounted sensor as input to an electronic passenger compartment discriminating sensor to permit a change in the sensor algorithm based of the output of the crush zone sensor to improve the performance of the electronic sensor.

Further objects and advantages of this invention will become obvious from the discussion below.

DETAILED DESCRIPTION OF THE PREFERRED EMBODIMENTS

Figure 1A:
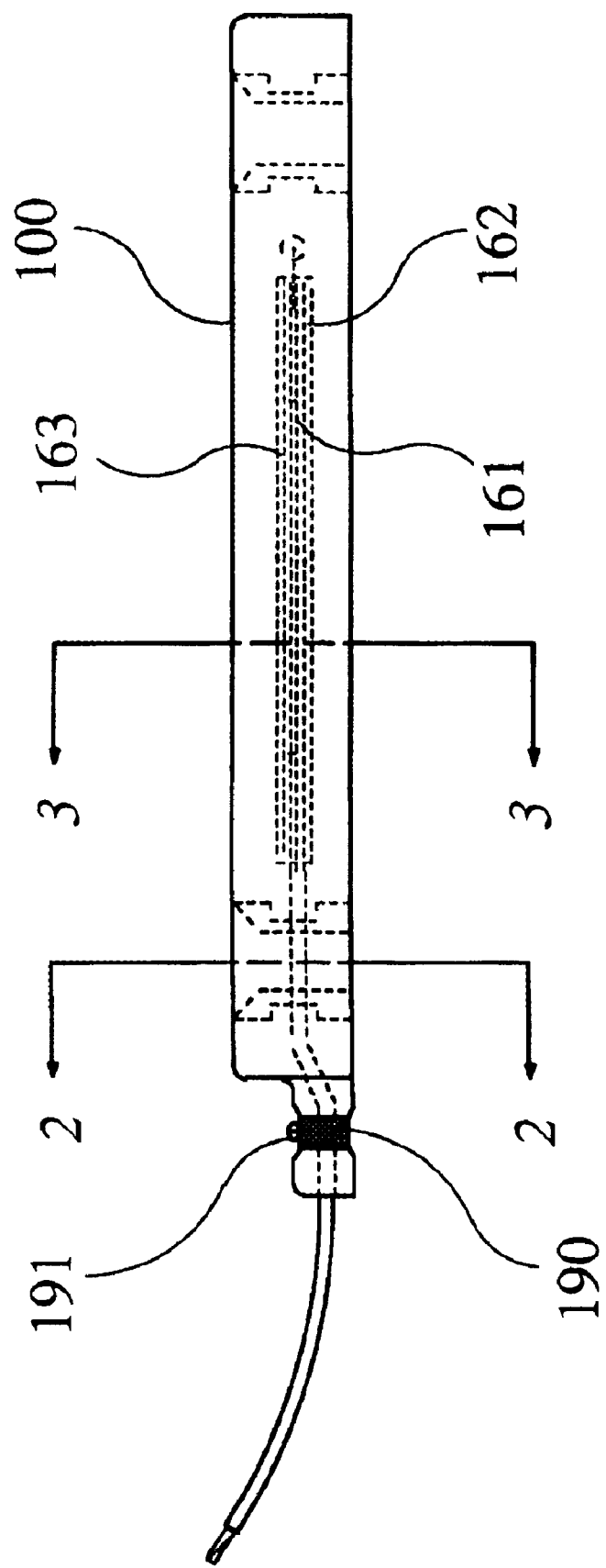
FIG. 1A is a plane view of a preferred embodiment of the crush sensor of this invention using a flex action tape switch.
Figure 1B:
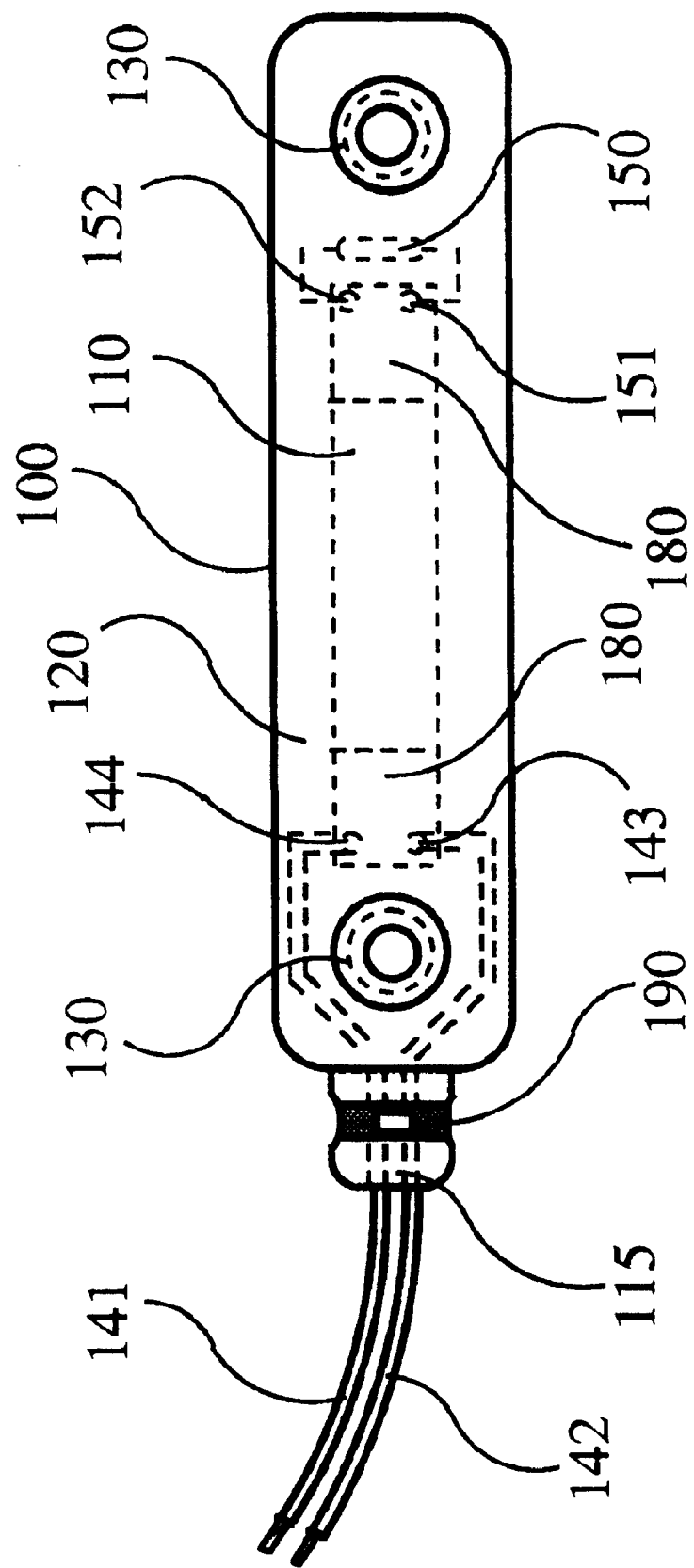
FIG. 1B is a plane view of the preferred embodiment of the crush sensor of this invention of FIG. 1A as viewed from the top.

A preferred implementation of the present invention is shown at 100 in FIG. 1A and FIG. 1B. A tape switch of any convenient length 110 is encapsulated by a thick elastomeric material 120. Wires 141 and 142 connect the sensor to other instrumentality of the restraint system. Wires 141 and 142 enter the sensor through strain relief grommet 115 which can also be made at the same time and of the same elastomeric material as 120. Eyelets 130, preferably made from metal, along with suitable fasteners such as bolts or sheet metal screws (not shown), provide the mounting hardware for attaching the sensor to a vehicle.

If the wires 141 and 142 are each made of a single strand, a near hermetic seal can be obtained by the proper pretreatment of the wires on the portion which passes through the grommet to cause them to be chemically bounded to the elastomeric material, as described in U.S. Pat. No. 3,522,575 of Watson et al. If the wires are multi-stranded, a reasonably good seal can be obtained if the wires are of the non-wicking type either through the chemical bonding between the elastomeric material 120 and the impregnating plastic used to render the wires non-wicking, or through the use of a metal clamping ring 190 as shown in FIG. 1. Ring 190 initially is larger than grommet 115 and is deformed at 191 to squeeze the ring around grommet 115. Such a ring places the elastomeric material in compression forming a seal around the wires 141 and 142. If the wires 141 and 142 are multi-stranded and not made non-wicking, the portion of the wire passing through grommet 115 can be fused together to form a single solid strand and handled in the same manner as the single strand case above. This fusing can be accomplished if the wire strands are coated with a metallic coating such as tin as is commonly done with tinned wire. In this case the tinning is thicker than normal and the portion of the wire that is to be fused is heated until the tin melts fusing the strands together and forming a solid. In any of these cases, it can be seen that this sensor can be easily sealed to prevent passage the of water or other contaminants into the sensor. This ease of sealing renders this sensor particularly suited for mounting in the crush zone of the vehicle where the sensor is exposed to rain, sleet, salt spray, radiator fluids, battery acid and other corrosive chemicals. This elastomeric encapsulation and compression band sealing method is also applicable to other sensor designs.

Wires 141 and 142 are attached to contact strips 161 and 162 at 143 and 144 by any convenient manner such as crimping or soldering. A diagnostic resistor 150 can be provided to permit the monitoring of the readiness of the sensor by the diagnostic system located elsewhere in the vehicle. This resistor 150, if present, is also attached to contact strips 161 and 162 at 151 and 152, as shown in FIG. 1B.

The contact strips 161 and 162 are prevented from making contact in the non actuating condition by insulator pads 180. A third metal strip 163, as shown in FIG. 3, can be provided to aid in the operation of the sensor as described below.

Figure 2:
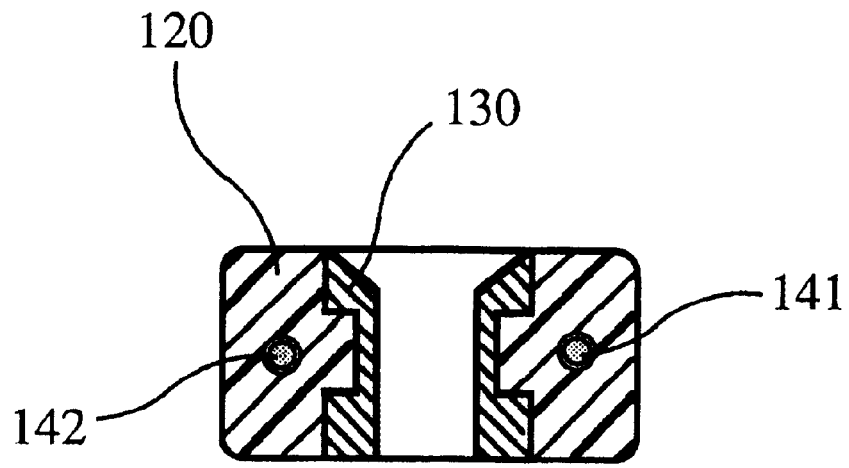
FIG. 2 is a cross section view of the sensor of FIG. 1A taken along 2—2.

Eyelet 130 is attached to elastomer 120 during the molding process as shown in FIG. 2.

Figure 3:
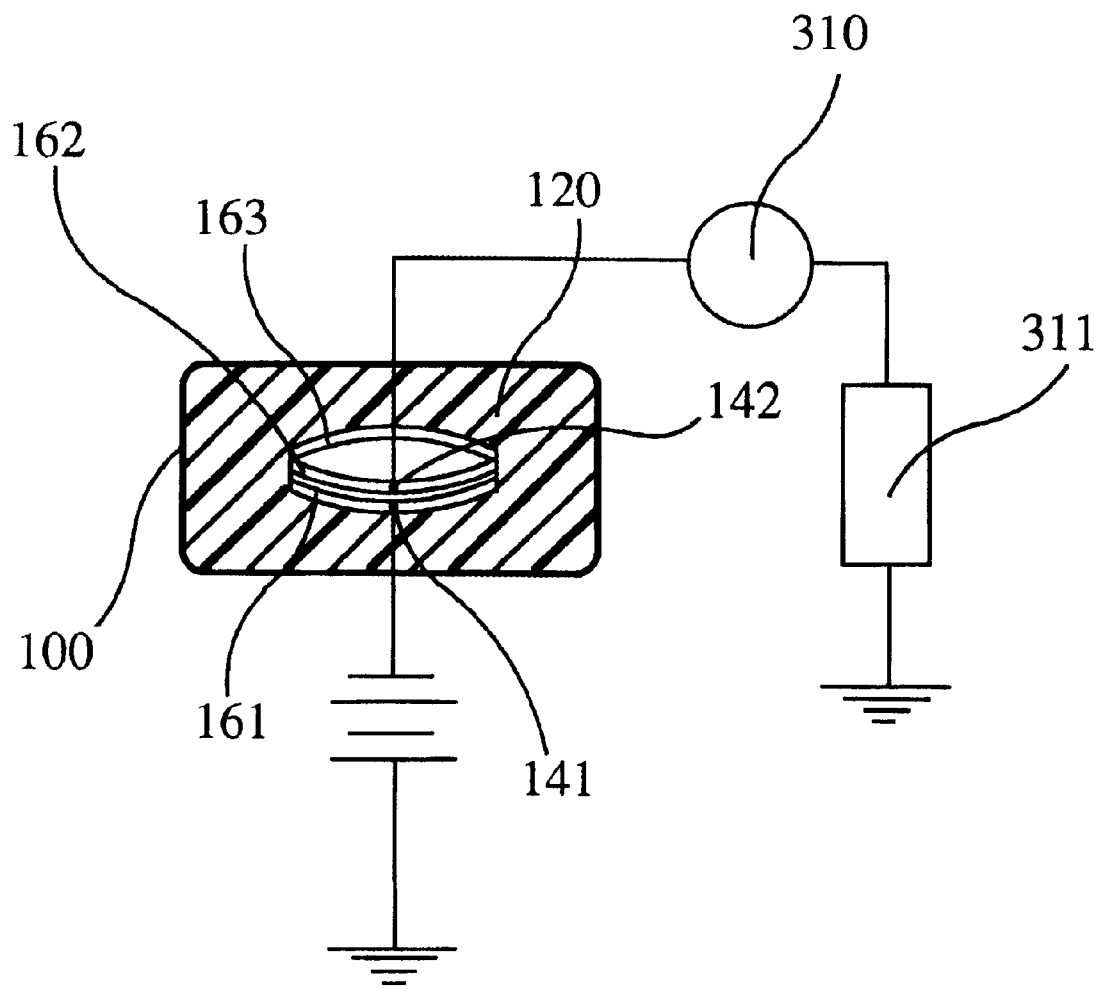
FIG. 3 is a cross section view of the sensor of FIG. 1A taken along 3—3 including a schematic of the remainder of the actuating circuit.

A section view through the sensor showing the three metal strips is shown in FIG. 3 where like numbers have the same meaning as in FIGS. 1A and 1B. Also, the attachment of the sensor to the remainder of the circuit is shown schematically where 310 represents the air bag module and 311 an arming sensor which is electrically in series with this crush zone mounted crush switch discriminating sensor.

Figure 4:
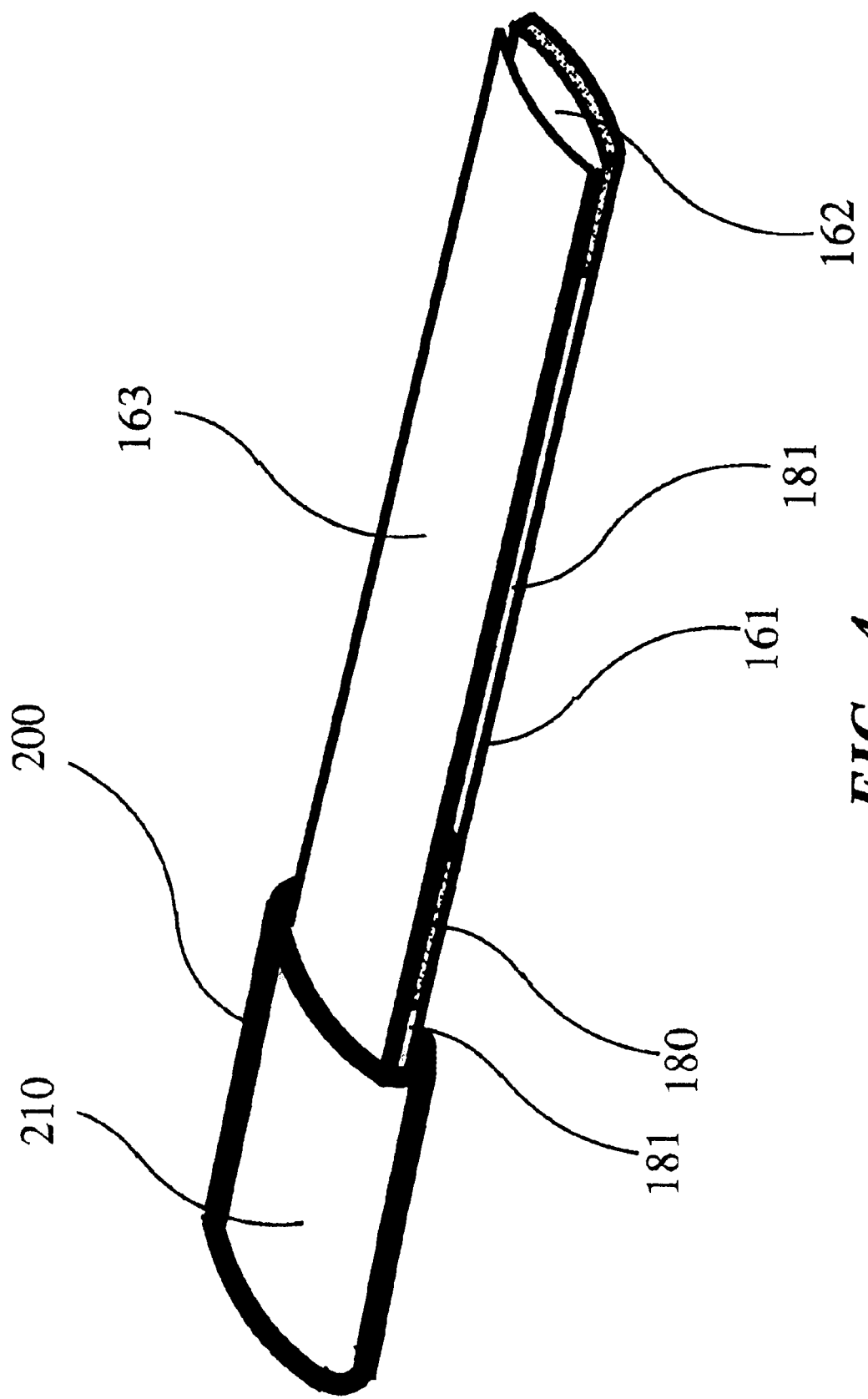
FIG. 4 is a perspective view, with portions cut away, of one embodiment of the flex action tape switch used in the sensor of FIG. 1B.

A perspective view of the tape switch portion of the sensor with certain portions removed is shown generally as 200 in FIG. 4. A protective cover 210, which is normally part of the tape switch, aids in the assembly of the tape switch into the sensor. In a typical manufacturing process, the elastomeric material 120 of FIG. 1A is cast around the tape switch, resistor and wire assembly. The protective cover 210 is heat sealed on both ends of the tape switch and serves to prevent the elastomeric material from flowing into the area of the contacts of the tape switch during the casting process.

A key feature of this embodiment of this invention is the use of a thick elastomeric encapsulation of the tape switch material. This greatly reduces the sensitivity of the tape switch and renders it suitable for use as a crash sensor. The thickness of this elastomeric material can be adjusted to control the sensitivity of the sensor as will be described in more detail below. The protective cover 210 is normally less than 0.025 inches thick while the elastomeric material is usually at least 0.1 inch thick. Preferred elastomeric encapsulation materials include polyurethane and silicone rubber although there are other materials which would also be suitable. These materials retain their flexibility to −40 degrees C. and are usable above 100 degrees C. making them suitable for this application.

Although the examples shown here employ the combination of a protective cover 210 and elastomeric encapsulation material 120, in some applications it is possible to extrude a thick protective cover and eliminate the elastomeric material 120 entirely. In this case the mounting can be accomplished by the use of an external bracket.

The contact strips 161 and 162 as shown in FIG. 4 are formed in a concave upward shape and separated by insulator pads 180 to thereby define voids 181 between adjacent insulator pads 180 along the length of the contact strips 160, 161. An additional strip 163 is formed in a concave downward shape and rests on top of contact 162. Strips 161, 162 and 163 could be made from any convenient metal material, however, copper coated spring steel is preferred. Other suitable materials include beryllium copper or beryllium nickel.

Figure 8:
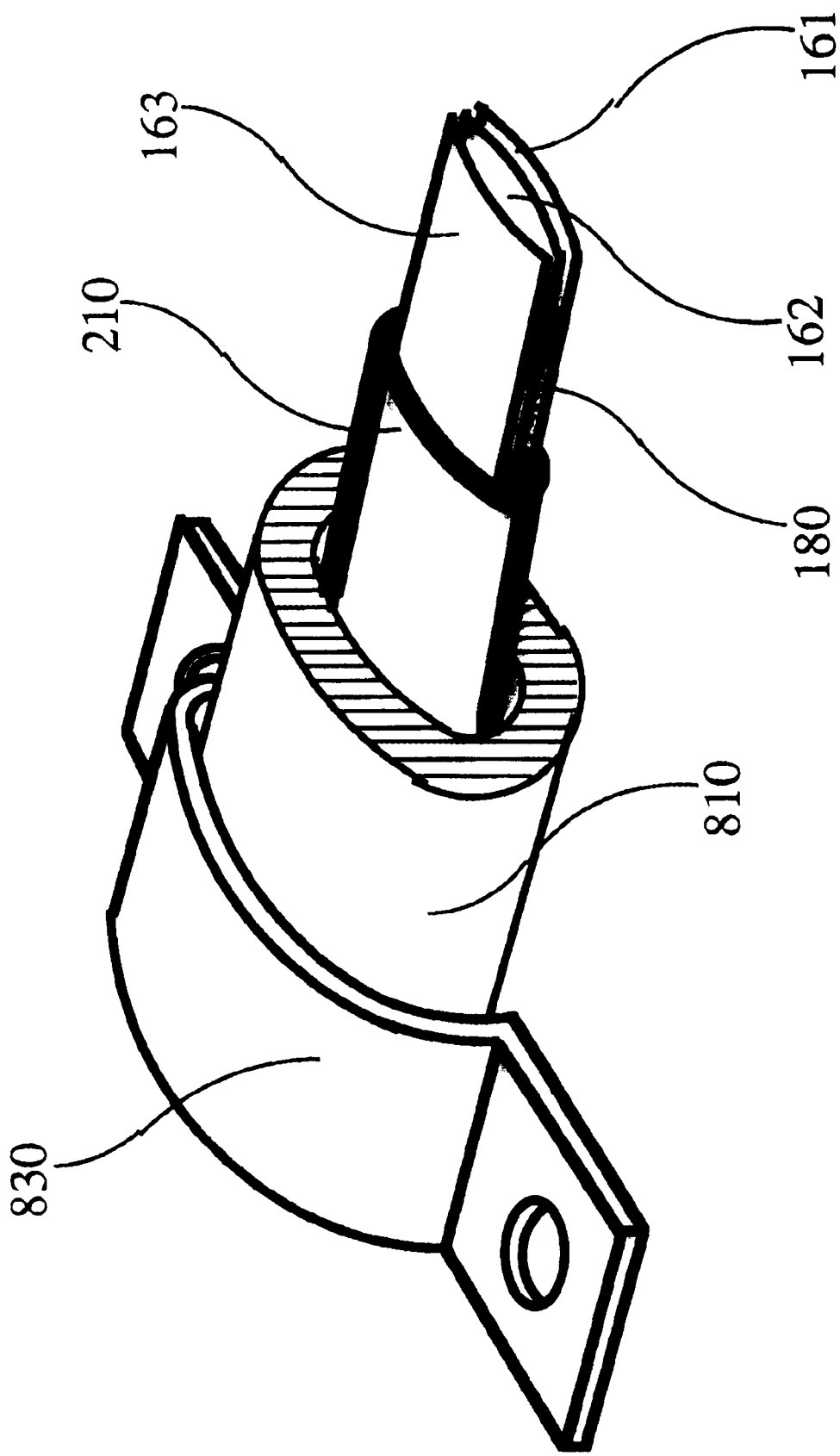
FIG. 8 is a perspective view, with portions cut away, of the flex action tape switch mounted inside of a tube.
Figure 10:
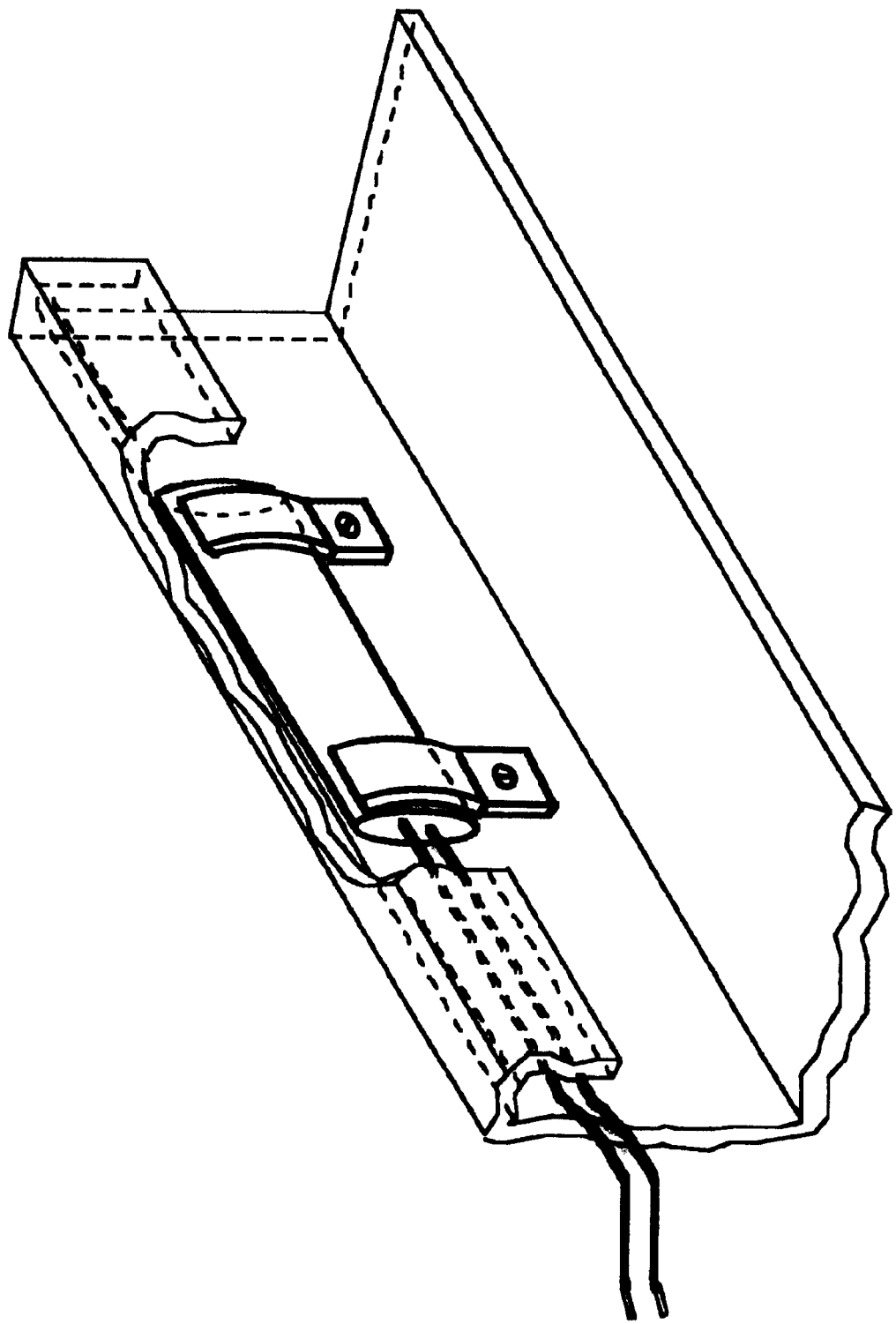
FIG. 10 is a plane view showing a tape switch crush sensor protected by a portion of the vehicle structure with a portion of the structure cut away.

Conventional tape switch material is too sensitive to be used by itself if it is exposed and the thick covering is used in this invention to significantly reduce this sensitivity. This could also be accomplished by enclosing the tape switch in a plastic or metal tube or other housing shape which deforms on impact to actuate the tape switch sensor. Such a structure is shown in FIG. 8 where a tube 810 of elliptical cross section performs a similar function as material 120 of FIG. 1A. The tube 810 is attached to the vehicle structure by means of external brackets 830. The protective function provided by this tube could also be incorporated and made a part of the vehicle structure further simplifying the sensor design since one part would now serve two functions. Although a tube of elliptical cross section is shown in FIG. 8, tubes having different and varying cross section shapes would also work. If the tube function is incorporated as part of the vehicle structure, as shown in FIG. 10, it might need not totally surround the tape switch as long as it is sufficient to protect the tape switch from inadvertent actuation.

For the purposes of this invention, structure will mean any piece of metal or plastic which is attached and made a part of the vehicle including all sheet metal, supporting metal members, plastic housings or coverings and any items attached to the vehicle including but not limited to the radiator, engine, shock absorbers etc., upon which a crash sensor can be attached or mounted.

Figure 5:
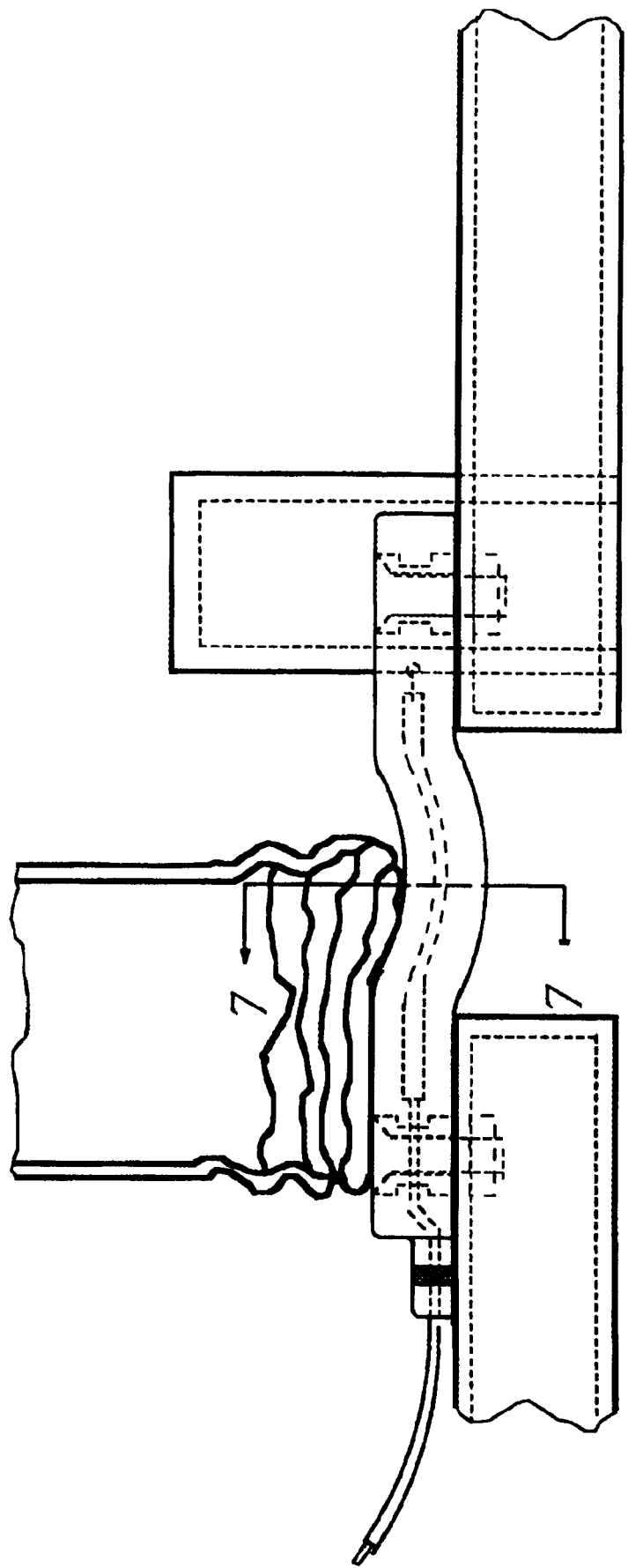
FIG. 5 is a plane view of the sensor as shown in FIG. 1B with the sensor in the actuating condition bent upon being impacted by crushed material in a crash.
Figure 6:
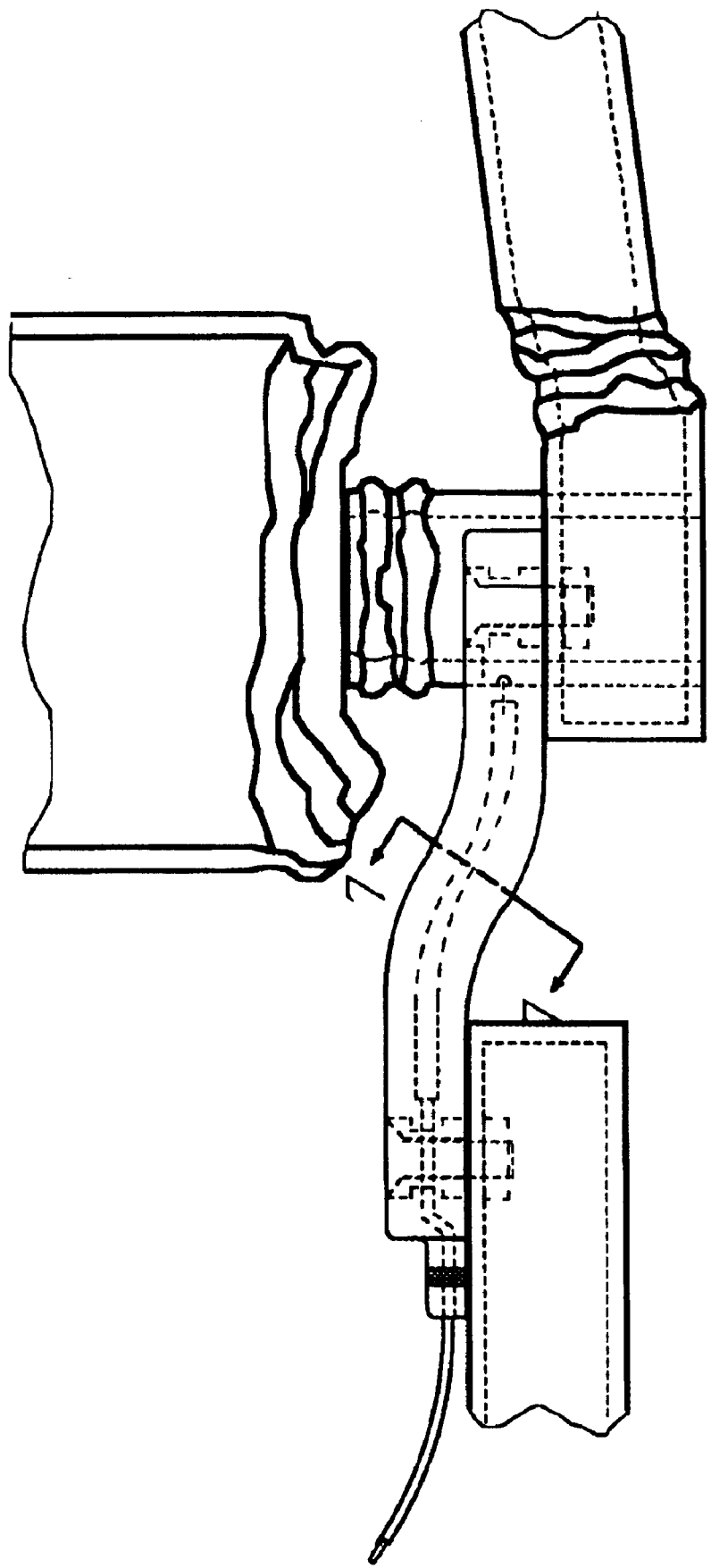
FIG. 6 is a plane view of the sensor as shown in FIG. 1B with the sensor in the actuating condition bent upon being bent along with the structure on which the sensor is mounted during a crash.
Figure 7:
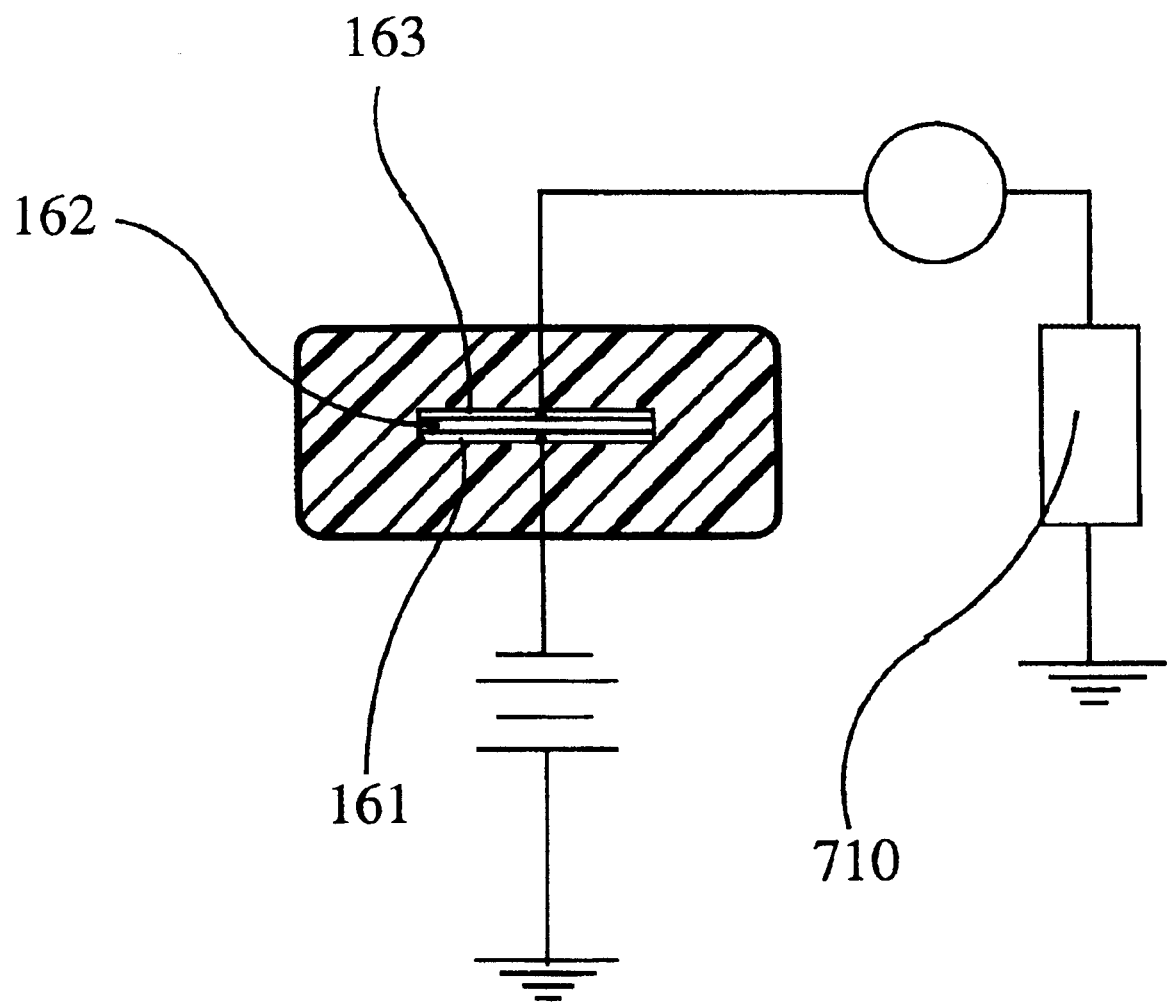
FIG. 7 is a cross section view of FIG. 5 or FIG. 6 taken along 7—7 also including a schematic of the remainder of the actuating circuit.

The switch can be activated by a pressure at any point between the insulator pads 180, as shown in FIG. 5, which causes the contact 161 to bend and touch contact 162 as shown in FIG. 7. In addition, when the switch is bent, as shown in FIG. 6, contacts 161 and 162, and strip 163 resist the bending force until this force becomes sufficient to cause all three of the strips to become flat at one point along the tape switch as shown in FIG. 7. This flattening occurs between the insulator pads 180, and causes contact strips 161 and 162 to touch completing an electrical circuit. This particular configuration renders this tape switch responsive to bending, as shown in FIG. 6. In contrast, normal tape switches do not close if bent but will do so only by an externally applied force.

This switch is also tolerant of particles which might lodge between the contact strips. In this case the flat area of contact moves slightly to a place where no particle exists. This feature greatly enhances the reliability of the sensor and eliminates the need for bifurcation of the contacts which is usually done to achieve the desired reliability. Alternately, portions of the surface of one of the contract strips can be deformed with ridges, for example, to enhance the contact forces.

The bending moment required to cause switch actuation in bending is partially determined by the thickness of strip 163. If this strip is made thick, a greater force is required to cause switch closure. The sensitivity of the sensor to pressure can be adjusted by the thickness and the durometer of elastomer 120. Thus, by varying the properties of elastomer 120 and the strip 163, a wide range of sensor sensitivity values can be achieved to permit discrimination between maintenance, road stone impacts or other abusive treatment of the sensor and an automobile crash. In some cases only two metal strips, 161 and 162, are present and the sensitivity can be adjusted by varying the thickness of one or both of these two strips. The presence of the third strip 163 helps assure that the sensor will close on bending. If 163 is not present, the ends of 161 and 162 must be held so that they will not move relative to each other in order to assure closure on bending alone. The bending angle required to cause the sensor to close is determined partially by the curvature of the metal strips and by the thickness of the insulating pads which cause the separation between the contact strips. These can also be adjusted by trial and error or by those experienced in the art. In another configuration, the insulating pads are replaced by ridges molded is part of the protective cover which holds the pads apart.

For most applications, the sensors of this invention are used in parallel with a discriminating sensor mounted in the passenger compartment if one is present. An alternative strategy, as shown schematically in FIG. 7, is also possible where the crush sensor is used in series with a non-crush zone discriminating sensor 710. In this case the non-crush zone sensor could be made more sensitive and would trigger earlier in certain crashes. It would not be as sensitive as an arming sensor which triggers on as little as one MPH. For the purposes herein, a non-crush zone discriminating sensor is defined as a sensor which will not trigger, or close an electric circuit, on a 5 MPH barrier crash but will close at some higher speed barrier crash. Normally, a non-crush zone discriminating sensor will require at least an 8 MPH barrier crash to close. Here, however, since it is to be used in series with a crush zone discriminating sensor, it can be made more sensitive so that it will trigger in time on many softer crashes. This arrangement could eliminate the need for a safing or arming sensor and would permit discrimination on high speed animal impacts where deployment of the restraint system is not desired. This strategy is made possible by virtue of the latching action of the crush switch sensor of this invention. In normal crush zone sensors, such as the ball-in-tube sensors of current design, sufficient contact closure cannot be guaranteed to assure simultaneous closure with the passenger compartment mounted discriminating sensor 710.

The one type of common crash which can defeat most crush zone sensors, is a high speed impact with an animal, such as a deer, where the sensor is directly impacted by the animal since he usually impacts the vehicle above the bumper. Typically, the total velocity change for this type of crash is less than 4 MPH. Normally, it is not possible to rely on the overlap of two discriminating sensors located at different points in the vehicle since a minimum contact closure duration for inertial type sensors cannot be guaranteed. For the tape switch sensor of the present invention, the contacts, once they close, will remain closed or latched until the vehicle is repaired or a wire is cut, as mentioned above. This feature, then, permits the discrimination on the deer impact even though the crush zone sensor might close.

This is the first use of an electromechanical crash sensor which latches closed during a crash. Normally, crash sensors must be tested during manufacture and therefore must reset themselves after each test. The tape switch sensor of this invention can also be tested prior to mounting on the vehicle and even after it has been mounted. After such testing it also resets itself. During a crash, however, it latches since the material on which it is mounted is permanently deformed. This fact permits the use of a crush zone sensor in series with a passenger compartment discriminating sensor, as shown in FIG. 7, to achieve a higher level of crash discrimination. Other sensor designs which can also be made to latch will now become obvious.

Figure 9:
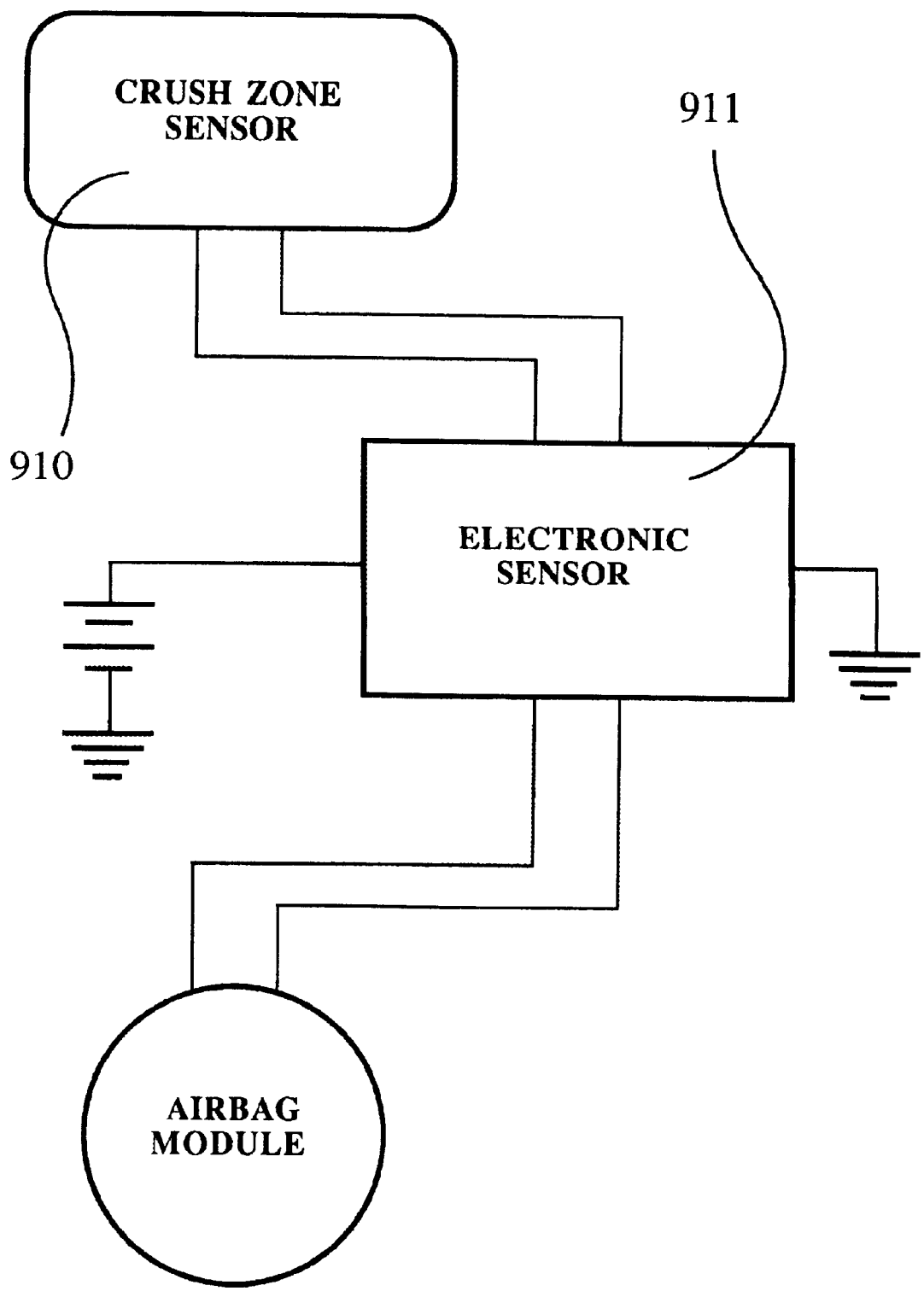
FIG. 9 is a circuit schematic showing a forward mounted sensor used as an input to an electronic sensor.

If the passenger compartment discriminating sensor is of the electronic type, the triggering threshold can be changed based on the condition of the crush switch sensor in the crush zone. Passenger compartment sensors sometimes trigger late on soft long duration crashes even though the velocity change is significantly higher than the desired deployment threshold. See for example, Breed, D. S. and Castelli, V. *Are Barrier Crashes Sufficient for Evaluating Air Bag Sensor Performance?*, SAE Paper 900548. In such a case, the fact that the crush switch sensor has triggered can be used to modify the velocity change required for the electronic sensor to trigger. Thus, in one case, the passenger compartment sensor can prevent the deployment of the air bag when the velocity change is too low as in the animal impact and in the second case, the crush zone sensor can cause the discriminating sensor to trigger faster in a soft crash and minimize the chance of a late triggering condition where the occupant is out of position and in danger of being injured by the deploying air bag. FIG. 9 shows schematically such a circuit where an electronic sensor 911 triggers deployment of the air bag and crush zone sensor 910 is used as input to the electronic sensor. In this case the current carrying capacity of the crush zone sensor can be much less and thinner wires can be used to connect it to the electronic sensor. In one scenario, the electronic sensor may be monitoring a crash in progress when suddenly the front crush zone sensor signals that the vehicle has crushed up to where the sensor is mounted. The electronic sensor now realizes that this is a soft, deep penetration crash which requires an air bag according to a modified algorithm. The conditions for deploying the air bag can be modified based on this crush information. In this manner the combined system can be much smarter than either sensor acting alone. A low speed offset pole or car-to-car underride are common real world examples where the electronic sensor in the passenger compartment might trigger late without the information provided by the forward mounted crush zone sensor.

Rotation of crush zone sensors is a very common problem experienced especially in low speed and angular car to car crashes and in low pole impacts. In one example the crush zone sensor moved 6 inches toward the rear of the vehicle while it was sensing and integrating the crash. If this sensor rotated during this motion, if might not trigger and the air bag would not be deployed. Frequently, the crushing mode of the front of the vehicle is such that the material moves rearward in the vehicle and strikes the sensor on an angle. When this happens, the crush zone sensor can rotate early in the crash and therefore be unable to sense and properly integrate the longitudinal acceleration. In such a case, the sensor may fail to trigger or trigger late. The crush sensor of this invention, as depicted in FIG. 1A, is designed to eliminate this problem since the sensor is attached to a portion of the vehicle which is known to deform in all air bag desired crashes. It is therefore not effected by rotation except that such forces would probably enhance sensor triggering.

In order to prevent seismic sensors from rotating in a crash, it has become common to increase the strength of the radiator support or other structure on which the sensor is mounted. The sensor mounting bracket, however, must then permit the sensor to move relative to this structure complicating the bracket design or this structure must be weakly attached to the remainder of the vehicle so that the whole assembly will move in the crash. This added structural strength adds weight to the vehicle and is not needed for the sensor of this invention. It is even desirable for the sensor of this invention to be mounted on weaker structural members in order to enhance the chance for the structure to deform especially in soft crashes. The use of the sensor of this invention, therefore, results in a weight saving for the vehicle which is very important with the increasingly stringent fuel economy standards mandated by the US Government.

Operation of the crush zone crash sensor of this invention, as well as all others, can be critically affected by the material which is located between the sensor and the front of the vehicle and the geometry of this material as it crushes and comes back to strike the sensor. The sensors of the present invention are considerably more tolerant to variations in the geometry of this material for two reasons. Considering the compression mode, the length of the sensor can be increased so that the probably of it being impacted is very high. Alternately, in the bending mode, the sensor can be attached to two portions of the vehicle which are likely to experience relative motion during the crash. In this latter case, the two portions of the vehicle effectively become extensions of the sensor. In some cases the radiator support structure is designed so that it will always deform at a particular location with the result that the sensor can be quite short since the entire radiator structure becomes an extension of the sensor. In other cases, such a location is not readily available and the sensor must be made longer to guarantee that it will be bent or compressed in a crash by crushed material coming from areas further forward in the vehicle.

The use of crush initiators is becoming increasingly common in vehicle design. These usually take the form of a hole, wrinkle, notch or bend intentionally placed in a structural member to cause the member to bend in a particular manner during a crash. As the sensor of the present invention is adapted to a particular vehicle, the use of crush initiators to control the manner in which the member, on which the sensor is mounted, bends will result in a shorter and more reliable sensor. Additional, usually minor, design modifications can also be used to permit the sensor to be mounted in protected locations so as to minimize the chance of sensor damage during vehicle maintenance.

The force required to cause sensor closure is an important design parameter of the sensor of this invention. In one typical design configuration, a 20 pound force on the sensor is required to move the front contact strip toward the rear member sufficiently to cause sensor closure in the compression mode. This force is sufficient so that it is unlikely for the sensor to inadvertently close during vehicle maintenance, stone and some animal impacts and yet this force is quite low compared to the forces typically experienced during even marginal crashes.

The angle required to cause sensor closure is also an important parameter of the sensor of this invention. In one typical design configuration, a 15 degree bend angle of the sensor is required to move the front contact strip toward the rear member sufficiently to cause sensor closure in the bending mode. This angle is sufficient so that it is unlikely for the sensor to inadvertently close during vehicle maintenance, stone and some animal impacts and yet this angle is quite low compared to the relative displacements and the angles that will occur in a sensor mounted on two locations which typically move relative to each other in even marginal crashes.

As can be appreciated from the above discussion, all of the objects of this invention have been effectively attained in an extremely simple device. Although several somewhat preferred embodiments have been disclosed and described in detail herein, it should be understood that this invention is in no sense limited thereby and its scope is to be determined by that of the appended claims.

I claim:

1. In a motor vehicle having a forward extremity, a crush zone immediately rearward of said forward extremity, said crush zone having vehicle elements, an improved crush sensor arranged in said crush zone and attached to at least one of said vehicle elements in said crush zone, and an occupant restraint system responsive to said crush sensor comprises:

(1) means arranged at a given position in said crush zone of the vehicle for determining when the vehicle elements in said crush zone have been deformed as far back in the vehicle as said given position; and (2) means responsive to said determining means for actuating said occupant restraint system when a vehicle impact with a barrier causes said vehicle elements in said crush zone to deform as far back as said position; said given position is a sufficient longitudinal distance rearward from said forward extremity of the vehicle such that an impact by said forward extremity with said barrier at a vehicle speed below a prescribed threshold value will not actuate said occupant restraint system;

the improvement being said determining means is a switch having an actuating member with a length dimension at least an order of magnitude larger than its width and thickness dimensions, said switch being designed to actuate upon bending of said actuating member, and wherein said switch and said at least one of said vehicle elements cooperate such that when said at least one of said elements deforms at said given position upon said impact at at least said prescribed threshold-value speed, bending of said actuating member intentionally occurs resulting in actuation of said switch.

2. The invention in accordance with claim 1, wherein said switch comprises:

(a) a tape switch containing a first electrically conductive member and a second electrically conductive member;

(b) cover means for reducing the sensitivity of said tape switch such that at least a twenty pound force on the sensor is required to cause said first conductive member to contact said second conductive member resulting in said sensor changing from a nonconducting to a conducting state;

and said invention having:

(i) said means for mounting said switch in the crush zone of the vehicle in a position on the vehicle likely to experience said force during a crash of sufficient magnitude that airbag deployment would be required so as to ensure cooperation of said switch with at least one said vehicle element;

(ii) mechanical means for contacting and applying a bending force to said switch to cause said first member to be displaced relative to said second member and wherein upon a crash of said sufficient magnitude, said portion of said vehicle experiences said force whereupon said conductive members make contact with each other and said sensor changes from said nonconducting state to said conducting state enabling airbag deployment.

3. The invention in accordance with claim 2, wherein said sensitivity reducing means comprises an encapsulation of said tape switch.

4. The invention in accordance with claim 2, wherein said sensitivity reducing means comprises an elastomeric material substantially surrounding said tape switch.

5. The invention in accordance with claim 2, wherein said sensitivity reducing means comprises a member of substantially tubular shape.

6. The invention in accordance with claim 1, wherein said switch latches during a crash.

7. The invention in accordance with claim 1, further comprising means to latch said switch in said responsive state.

8. The invention in accordance with claim 7 wherein said latching means comprises vehicle structure upon which said sensor is mounted.

9. The invention in accordance with claim 1, wherein said at least one of said vehicle elements comprises a structural member of said vehicle, and wherein said determining means is attached to said structural member to detect that said structural member has deformed.

10. The invention in accordance with claim 1, wherein said switch is a tape switch.

* * * * *